United States Patent [19]
Chang et al.

[11] Patent Number: 5,539,745
[45] Date of Patent: * Jul. 23, 1996

[54] METHOD AND APPARATUS FOR REDUCING THE TRANSMISSION OF REPETITIVE BROADCAST DATAGRAMS OVER COMMUNICATION LINKS

[75] Inventors: Eugene Y. Chang, Cambridge; David B. Richardson, Bellingham; Bennett C. Baker, Dedham, all of Mass.

[73] Assignee: Microcom Systems, Inc., Granada Hills, Calif.

[*] Notice: The portion of the term of this patent subsequent to Jun. 14, 2011, has been disclaimed.

[21] Appl. No.: 254,995

[22] Filed: Jun. 7, 1994

Related U.S. Application Data

[63] Continuation of Ser. No. 15,420, Feb. 9, 1993, Pat. No. 5,321,694, which is a continuation-in-part of Ser. No. 763,340, Sep. 20, 1991, Pat. No. 5,280,481.

[51] Int. Cl.$^6$ .......................... H04L 12/46; H04L 12/66; H04L 29/02

[52] U.S. Cl. .................................. 370/85.13; 370/85.14; 370/94.1

[58] Field of Search ............................ 370/85.13, 85.14, 370/94.1, 94.2, 60, 60.1, 17, 13, 94.3

[56] References Cited

U.S. PATENT DOCUMENTS

| | | | |
|---|---|---|---|
| 4,715,030 | 12/1987 | Koch et al. | 370/85.13 |
| 4,818,984 | 4/1989 | Chang et al. | 340/825.54 |
| 4,868,866 | 9/1989 | Williams, Jr. | 380/49 |
| 5,031,174 | 7/1991 | Natsume | 370/85.14 |
| 5,081,621 | 1/1992 | Sugimoto | 370/85.13 |
| 5,168,496 | 12/1992 | Ohba et al. | 370/85.14 |

OTHER PUBLICATIONS

IBM Technical Disclosure Bulletin, vol. 32, No. 10A, Mar. 1990, "Short Hold Mode in ISDN", pp. 47–49.
NetWare MultiProtocol Router Supervisor's Guide Version 2.0 by Novell, copyright 1992, seven-page excerpt.
International Search Report for PCT/US94/01274, five pages.
Topkis, "Concurrent Broadcast for Information Dissemination", IEEE Transactions on Software Engineering, vol. SE–11, No. 10, Oct. 1985, pp. 1107–1112.
Vonderweidt et al., "A Multipoint Communication Service for Interactive Applications", IEEE Transactions on Communications, vol. 39, No. 12, Dec. 1991, pp. 1875–1885.

*Primary Examiner*—Wellington Chin
*Attorney, Agent, or Firm*—Lappin & Kusmer

[57] ABSTRACT

The invention relates to a method and apparatus for reducing the flow of repetitive broadcast datagrams over a communication link between two local area networks while still maintaining reception of all of the repetitive broadcast datagrams generated and intended by one of the local area networks for transmission to the other local area network over the communication link. The reduction, which can be to zero, occurs for intermittent periods of time having various durations.

14 Claims, 3 Drawing Sheets

METHOD AND APPARATUS FOR REDUCING THE TRANSMISSION OF REPETITIVE BROADCAST DATAGRAMS OVER COMMUNICATION LINKS

CROSS-REFERENCE TO RELATED APPLICATIONS

This is a continuation of U.S. patent application Ser. No. 08/015,420, filed Feb. 9, 1993, now U.S. Pat. No. 5,321,694, which is a continuation-in-part of U.S. patent application Ser. No. 07/763,340, filed Sep. 20, 1991 now U.S. Pat. No. 5,280,481.

BACKGROUND OF THE INVENTION

This invention relates to reducing the flow of broadcast datagrams over a communication link, and more particularly, to a method and apparatus for reducing such datagrams while maintaining reception of all broadcast datagrams by local area networks (LANs) coupled to either end of the communication link.

LANs provide a method for connecting computers or other devices together to exchange data or to harness groups of computers together to apply their combined power to a single problem. (The terms device and node as used herein refer generally to any of a variety of systems which can be connected to a LAN, including computers, file servers, routers, and bridges.) Generally speaking, a LAN includes: 1) a high speed transmission medium, typically metallic or fiber optic, for connecting each of the devices to the LAN; 2) the ability to transmit a message on the transmission medium directed to a single device (known as "directed datagram"); and 3) a means known as "broadcast" in which all devices connected to the LAN medium can receive a message transmitted on the medium. A standard for the implementation of LAN devices and systems has been established by the Institute of Electrical and Electronic Engineers as IEEE Standard 802.

The physical length of the transmission medium and the total number of devices which can be connected thereto are typically limited on a LAN due to the physics of high speed transmission systems. Bridges and routers are devices used to connect multiple LANs to provide communications between individual LANs and to construct large networks that transcend the technical size limits of a single individual LAN. When the individual LANs to be interconnected are at geographically remote locations, bridges and routers are used in pairs, one at each site, to provide a path for data to flow from one LAN to another, with a lower speed communication link (e.g., a private long distance telephone line) between the bridge or router pair. Typically the data rates of the long distance communication link between the bridge or router pair is a fraction of the data rate of the LAN medium. The use of bridges and routers has been limited, however, due to the cost of these devices and the costs of the long distance communication link.

An all-digital telephone network, known as the Integrated Services Digital Network ("ISDN"), has become a potential substitute for the private long distance lines currently used by bridges and routers. ISDN provides relatively high speed digital transmission service on an "as needed" basis, and is different from LAN transmission media in that it is a switched transmission media which provides a point-to-point transmission service on an intermittent basis.

Devices on LANs typically use three kinds of messages to transport information: directed datagrams, multicast datagrams, and broadcast datagrams. Some devices on a LAN require a constant exchange of broadcast datagrams to maintain proper operation. The traffic load of these broadcast datagrams on private lines or switched lines (e.g., circuit switched lines or packet switched lines) can be a significant percentage of the traffic capacity of the lines.

Some devices on a LAN such as routers and file servers rely on a continuous stream of broadcast datagrams to exchange topology and other information for proper operation. Interruption of this flow for a prolonged period (e.g., 60 seconds or more) will result in undesirable behavior of these devices.

It is desirable to reduce the traffic of broadcast datagrams over a communication link between LANs without interrupting the flow of such datagrams to devices on the LANs which must receive the broadcast datagrams in order to operate properly.

SUMMARY OF THE INVENTION

The disclosed invention relates to reducing the flow of broadcast datagrams over a private or switched communication link at one end of the link, while maintaining the equivalent flow of broadcast datagrams at the other end of the link. The flow can be reduced (as far down as zero) for intermittent periods of time which can be of various durations. As a result, if private lines are used as the link, the private lines can be replaced with lines having less bandwidth, resulting in a significant cost savings. If circuit switched or packet switched lines are used as the link, the link can be disconnected altogether, resulting in a period of zero bandwidth without adversely affecting devices that require receiving a constant flow of broadcast datagrams. That is, a destination LAN will receive all of the broadcast datagrams generated and intended by a source LAN to be transmitted to the destination LAN via a communication link despite the non-existence of the link. For stable networks with low traffic, a circuit switched or packet switched line coupling two stable networks can be disconnected for long periods without affecting the integrity of the information transported by the broadcast datagrams.

The invention thus permits disconnection of a switched communication link which would normally be used to transmit broadcast datagrams without blocking the "virtual" flow of broadcast datagrams; a LAN on either end of the link continues to operate as if all links are actually connected. The invention achieves cost savings by minimizing the actual use of a switched communication link (i.e., no traffic for intermittent periods of time) while realizing the benefits of the continuous flow of broadcast datagrams between LANs.

A method according to the invention can be performed by any communication device that passes datagrams between two LANs. Using bridges or routers to perform processes according to the invention is especially beneficial because such communication devices typically have slow (relative to the native data rates of the LANs) speed, low bandwidth data links.

In general, in one aspect, the invention features a device comprising means coupled to a first LAN for receiving, identifying, and discarding repetitive broadcast datagrams generated by the first LAN and intended to be sent over a communication link to a remote LAN, and means coupled to the first LAN for periodically providing repetitive broadcast datagrams to the first LAN which correspond to repetitive broadcast datagrams discarded by a remote transmitter coupled to the remote LAN.

Other aspects, features, and advantages of the invention will become apparent from the following description and from the claims.

DETAILED DESCRIPTION

Figure 1:
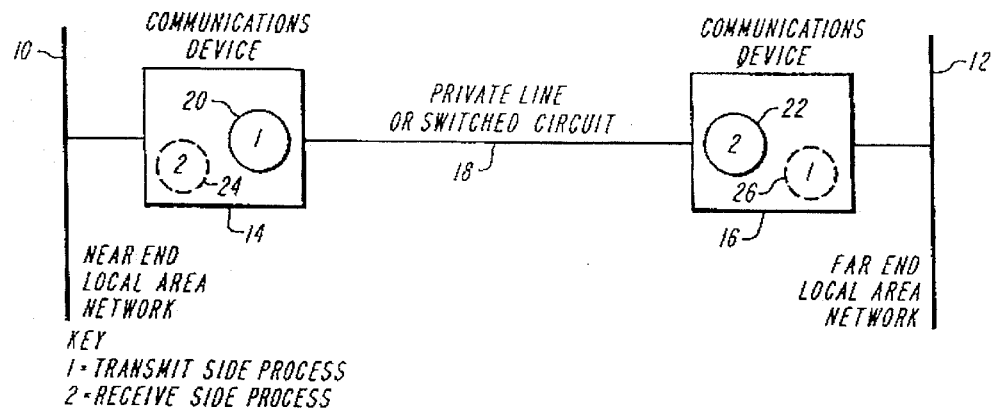
FIG. 1 is a block diagram of a system according to the invention.

Referring to FIG. 1, two individual LANs 10, 12 located, for example, at geographically remote locations can be interconnected by a pair of communication devices 14, 16 having a communication link 18 therebetween. The link 18 can be a private line, or a switched line such as a circuit switched line or a packet switched line. The link 18 generally has data rates which are lower than the data rate of the LANs 10, 12, typically a fraction of the data rate of the LANs.

The communication devices 14, 16 can be a pair of bridges, a pair of routers, or a pair of LAN emulators. (LAN emulators are described in detail in the parent application, U.S. Ser. No. 763,340). In general, the communication devices 14, 16 can be any devices which pass datagrams between LANs.

Nodes (not shown) connected to the LANs 10, 12, as well as the devices 14, 16 themselves, can generate datagrams of various types and place the generated datagrams on the LAN to which they are connected for transmission to other nodes. The datagrams typically are of three types: directed, multicast, and broadcast.

In one embodiment, the device 14 runs a transmit-side process 20 according to the invention, and the device 16 runs a receive-side process 22 in accordance with the invention.

Briefly and in general, in running the transmit-side process 20, the device 14 receives a broadcast datagram generated by a node connected to the LAN 10 (or generated by the device 14 itself) and determines whether the broadcast datagram is repetitive. A broadcast datagram is repetitive if it previously has been sent over the link 18 to the LAN 12. If it is repetitive, the device 14 does not transmit the broadcast datagram over the link 18 to the LAN 12 but instead discards it (i.e., does nothing with it). When the device 14 receives a series of repetitive broadcast datagrams, none of them are sent over the link 18 to the LAN 12, resulting in the elimination of the flow of such broadcast datagrams over the link 18.

In brief and generally, in running the receive-side process 22, the device 16 periodically provides, to the LAN 12, copies of broadcast datagrams previously received over the link 18 from the LAN 10. That is, the device 16 creates the flow of repetitive broadcast datagrams not by receiving the repetitive broadcast datagrams from the link 18 and passing them to the LAN 12 but by, in effect, generating the flow.

Thus, without actually transmitting the repetitive broadcast datagrams over the link 18, the LAN 12 receives all of the repetitive broadcast datagrams that the LAN 10 intended the LAN 12 to receive. This reception of all of the repetitive broadcast datagrams that the LAN 10 intended the LAN 12 to receive without actually transmitting the repetitive broadcast datagrams over the link 18 can be referred to as maintaining the "virtual" flow of such datagrams while eliminating (or at least reducing) the "actual" flow of such datagrams.

As long as the device 14, in executing the transmit-side process 20, receives repetitive broadcast datagrams, the device 14 will eliminate the actual flow of these repetitive datagrams over the link 18 and the device 16, in executing the receive-side process 22, will maintain the virtual flow to the LAN 12. When the device 14 discovers a broadcast datagram that it previously has not sent over the link to the device 16, the actual flow over the link 18 resumes. That is, while the actual flow is reduced (possibly to zero such that it is eliminated) for a period of time, the actual flow over the link resumes when a series of repetitive broadcast datagrams are no longer being generated by the LAN 10.

Note that while the device 14 and the device 16 are described herein as performing, respectively, only the transmit-side process 20 and the receive-side process 22, it should be understood that each of the devices 14, 16 generally will perform both a transmit-side and a receive-side process. Two dotted circles 24, 26 are shown in FIG. 1 to emphasize this point.

A system can be tailored to take advantage of the fact that the flow of broadcast datagrams over the link 18 can be eliminated (or at least reduced). For instance, if private lines are used as the link 18, private lines can be selected which have less bandwidth than would ordinarily be required. Note that the directed datagrams and the multicast datagrams are very sporadic and bursty in nature. Because of the continuous flow of broadcast datagrams required for proper operation, the link cannot be disconnected in a traditional system even when bursts of directed datagrams and/or multicast datagrams cease. By eliminating the transmission of repetitive broadcast datagrams over the link for periods of time, the present invention allows the link to be disconnected for those periods of time (provided no directed datagrams or multicast datagrams are transmitted via the link during those periods of time).

If switched (e.g., circuit switched or packet switched) lines are used as the link 18, the link 18 can be disconnected altogether, resulting in a period of zero bandwidth (i.e., no traffic at all) and the cost savings corresponding to such a reduction of the actual use of the link 18. But when the LAN 10 sends a broadcast datagram to the device 14 which is different from the repetitive broadcast datagrams being discarded by the device 14, the link 18 generally must be reconnected so the different broadcast datagram can be transmitted over the link 18 to the LAN 12. Note that when a switched line is used as the link 18, the switched line can be eliminated (i.e., disconnected) during periods when broadcast datagrams are being discarded and neither directed datagrams nor multicast datagrams are being transmitted via the link. The switched line is reconnected when it is necessary to transmit directed datagrams or multicast datagrams, or broadcast datagrams that cannot be discarded.

The process of reducing or eliminating, for a period of time, the actual flow of broadcast datagrams over a link coupling the device 14 and the device 16 (whether or not the link is disconnected) and then later resuming the actual flow of broadcast datagrams over a link generally can be referred to as suspend/resume.

If both LANs 10, 12 are "stable," all broadcast datagrams typically are identical and thus repetitive. Consequently, when both LANs 10, 12 are stable, the flow of repetitive broadcast datagrams over the link 18 is eliminated and all of the attendant benefits described previously and elsewhere herein are realizable. If one or both of the LANs 10, 12 is "unstable," it generally is not possible to eliminate the flow of broadcast datagrams over the link 18 (i.e., the broadcast datagrams must be sent over the link).

In general, a LAN is stable when all nodes and devices connected to the LAN are operating properly, e.g., no failures are occurring and no node or device is being added as a participant to the LAN or removed from the LAN. Conversely, a LAN is unstable when one or more of the nodes or devices connected to the LAN is changing from an operational state to a non-operational state, or vice versa.

Figure 2:
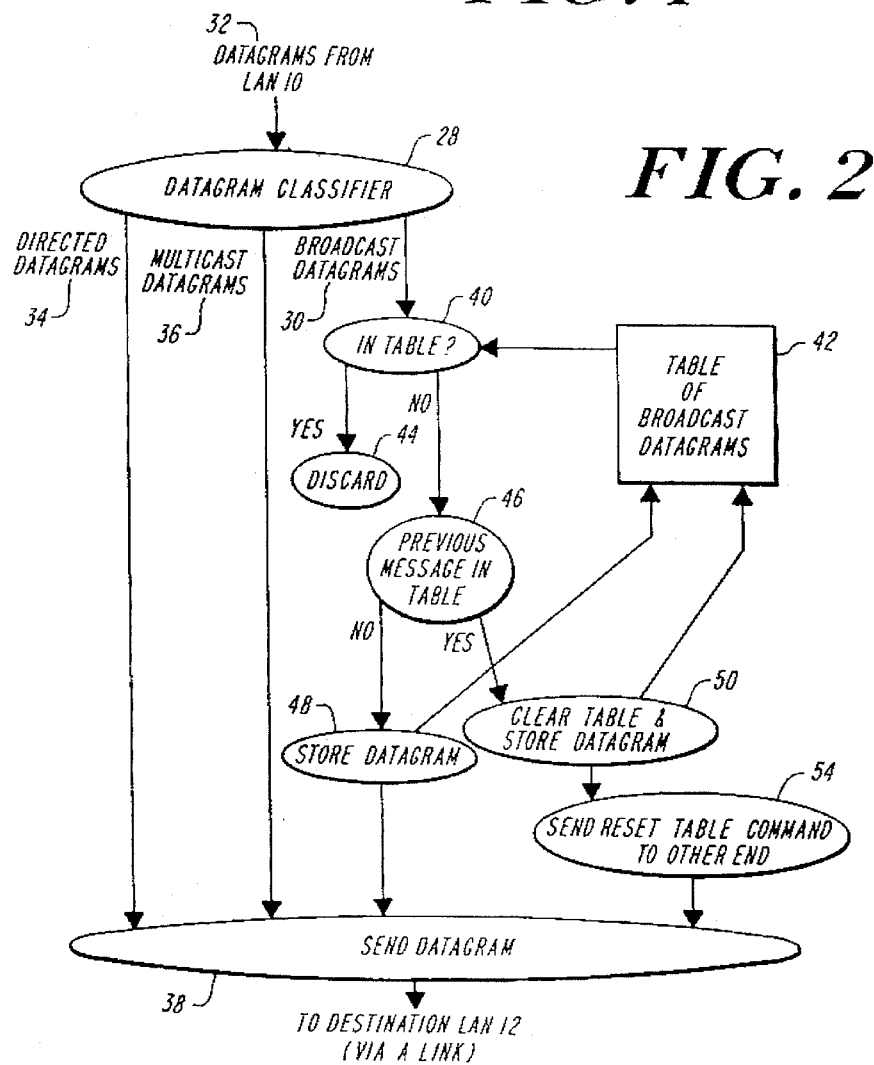
FIG. 2 is a diagram of a transmit-side process according to the invention.

Referring to FIG. 2, to perform the transmit-side process, the device 14 includes a datagram classifier 28 which receives datagrams 32 from the LAN 10. The datagrams 32 typically are either of the directed type, the multicast type, or the broadcast type. The classifier 28 identifies the type of datagram, and sends all directed datagrams 34 and multicast datagrams 36 to a sender 38 which transmits them to the LAN 12 over a communication link.

When the classifier 28 identifies a broadcast datagram 30, the device 14 determines (step 40) whether the broadcast datagram 30 is stored in a table 42 by comparing the broadcast datagram with entries in the table 42 (i.e., by performing a table lookup). If the broadcast datagram matches an entry in the table 42, the broadcast datagram is discarded, at step 44. During any period when broadcast datagrams 30 are being discarded (step 44) and directed datagrams 34 and multicast datagrams 36 are not being transmitted by the sender 38, the link between the devices 14, 16 can be disconnected. (In executing the receive-side process described previously and hereinafter with reference to FIGS. 4 and 5, the device 16 will "regenerate" the discarded datagram and provide it to the LAN 12.) If the broadcast datagram does not match an entry in the table 42, the broadcast datagram is passed to step 46.

The table 42 contains an entry for each broadcast datagram that previously has been sent by the device 14 to the LAN 12 via a communication link between the device 14 and the device 16. In one embodiment, each entry is only a "signature" of each broadcast datagram previously sent, where "signature" means a representation which contains less information than the actual broadcast datagram. For example, if the broadcast datagram is 1500 bytes in length, its signature might only have 4 bytes. Using a signature instead of the entire broadcast datagram allows for quick table lookup and minimizes the size of the table.

At step 46, the device 14 compares the broadcast datagram with the previous broadcast datagram to determine whether the previous broadcast datagram matched an entry in the table 42. If the previous broadcast datagram also did not match an entry in the table 42, the broadcast datagram is entered into (i.e., stored in) the table 42, at step 48, and the broadcast datagram also is passed to the sender 38 which sends the broadcast datagram to LAN 12 via a communication link coupling device 14 to device 16. Note that if switched lines are being used and the link is disconnected, the link is re-established by sending a reset table command (step 54) to the LAN 12 before the broadcast datagram can be transmitted to the LAN 12.

If the previous broadcast datagram did match an entry in the table 42 (recall that we arrived at step 46 because the broadcast datagram did not match an entry in the table 42), the table 42 is cleared and the broadcast datagram is stored in the table 42 as the, for now, lone entry (step 50). Clearing the table 42 at step 50 begins the process of building a new table of broadcast datagrams (i.e., the process of putting new entries into the table 42). Clearing of the table 42 also triggers the sending of a special flush message (step 54) to clear a table 52 at the device 16. The sender 38 sends the special flush message to the device 16 (which is executing the receive-side process) via a communication link between the devices 14, 16.

Figure 3:
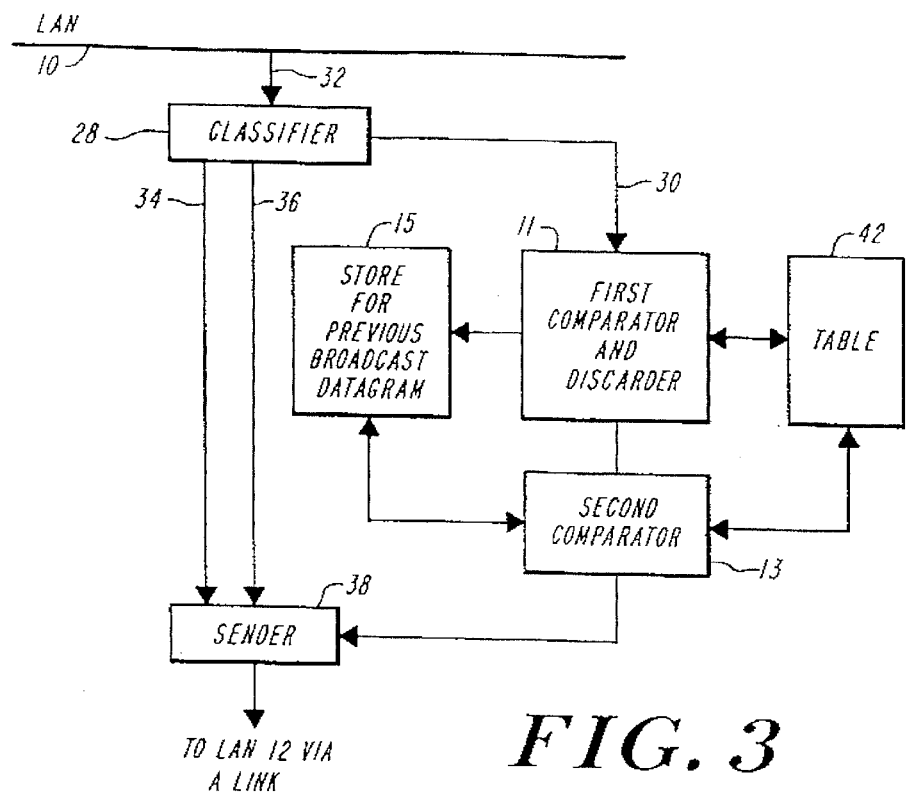
FIG. 3 is a functional block diagram of a device for performing the transmit-side process.

To perform the transmit-side process, the device 14 includes the modules shown in FIG. 3. The classifier 28 passes broadcast datagrams 30 (received from the LAN 10) to a first comparator 11 which compares the broadcast datagram with entries in the table 42 to determine whether the broadcast datagram is present in the table 42. The first comparator 11 discards the broadcast datagram if it matches an entry in the table 42. If no match is found by the first comparator 11, the broadcast datagram is passed to a second comparator 13. In all cases, the first comparator 11 places in a store 15 an indication of whether or not a match is found. The indication can be a single bit such as a "1" if a match is found or a "0" if a match is not found. The store 15 contains indications of whether a match was found for both the current broadcast datagram and the previous broadcast datagram.

The second comparator 13 checks the store 15 to determine whether the previous broadcast datagram matched an entry in the table 42. If the contents of the store 15 indicate that the previous broadcast datagram did not match an entry in the table 42 (as the current broadcast datagram does not), the second comparator 13 stores the current broadcast datagram in the table 42 and then passes it to the sender 38 which sends it to LAN 12 via a communication link coupling device 14 to device 16. If the contents of the store 15 indicate that the previous broadcast datagram did match an entry in the table 42, the second comparator 13 clears the table 42, stores the current broadcast datagram in the table 42, and passes a special flush message to the sender 38. The sender 38 sends the special flush message to the device 16 via a communication link between the devices 14, 16.

Figure 4:
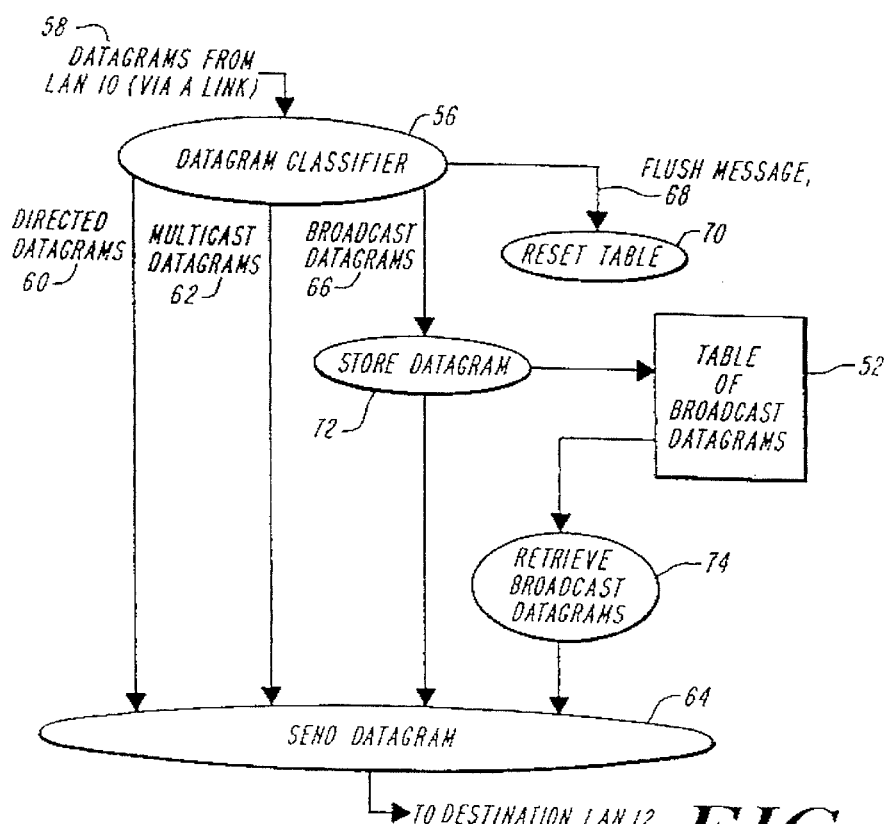
FIG. 4 is a diagram of a receive-side process according to the invention.

Referring to FIG. 4, to perform the receive-side process, the device 16 includes a datagram classifier 56 which receives datagrams 58 sent over a communication link between the device 14 and the device 16. As with the datagrams 32 handled by the device 14, the datagrams 58 typically are either of the directed type, the multicast type, or the broadcast type. The classifier 56 identifies the type of datagram, and sends all directed datagrams 60 and multicast datagrams 62 to a sender 64 which provides them to the LAN 12.

The classifier 56 also can receive and identify special flush messages 68 sent by the device 14. When the classifier 56 detects a special flush message 68, the device 16 clears the table 52 (step 70).

The table 52 contains an entry for each broadcast datagram that previously has been received by the device 16 via a communication link between the devices 14, 16 and then provided to the LAN 12 by the device 16.

When the classifier 56 identifies a broadcast datagram 66, the device 16 stores (step 72) the broadcast datagram 66 in the table 52 and then passes the broadcast datagram 66 to the sender 64 which provides it to the LAN 12.

The device 16 "regenerates" the broadcast datagrams discarded (step 44 of FIG. 2) by the device 14. That is, broadcast datagrams which were not sent over a communication link from the device 14 to the device 16 are nevertheless supplied by the device 16 to the LAN 12. The device 16 performs the "regeneration" by retrieving entries from the table 52 and providing those retrieved broadcast datagrams to the sender 64 (step 74), which provides them to the LAN 12. The retrieval of broadcast datagrams from the table 52 is done periodically, for example, by using a timer 75. By setting the period of the timer to match the frequency with which broadcast datagrams are transmitted by the LAN 10 (which is predeterminable), the device 16 provides the LAN 12 with all of the broadcast datagrams transmitted by the transmit-side process 20, even the repetitive broadcast datagrams that were discarded by the device 14.

The retrieved broadcast datagram generally does not correspond one-to-one to the discarded broadcast datagram. That is, the transmit-side process 20 running in the device 14 generally is not in lock-step with the receive-side process 22 running in the device 16. Thus, the retrieved broadcast datagrams generally are provided to the LAN 12 in an order which does not match the exact order of the discarded broadcast datagrams. Applicants realized that the order generally is irrelevant as long as each of the discarded broadcast datagrams are in fact provided to the LAN 12 within some time window (e.g., within 60 seconds).

The LAN 12 cannot distinguish between broadcast datagrams that are retrieved from the table 52 and broadcast datagrams that are sent from the LAN 10 over a communication link to the LAN 12. That is, the LAN 12 cannot distinguish the virtual flow of broadcast datagrams from the actual flow of broadcast datagrams.

Figure 5:
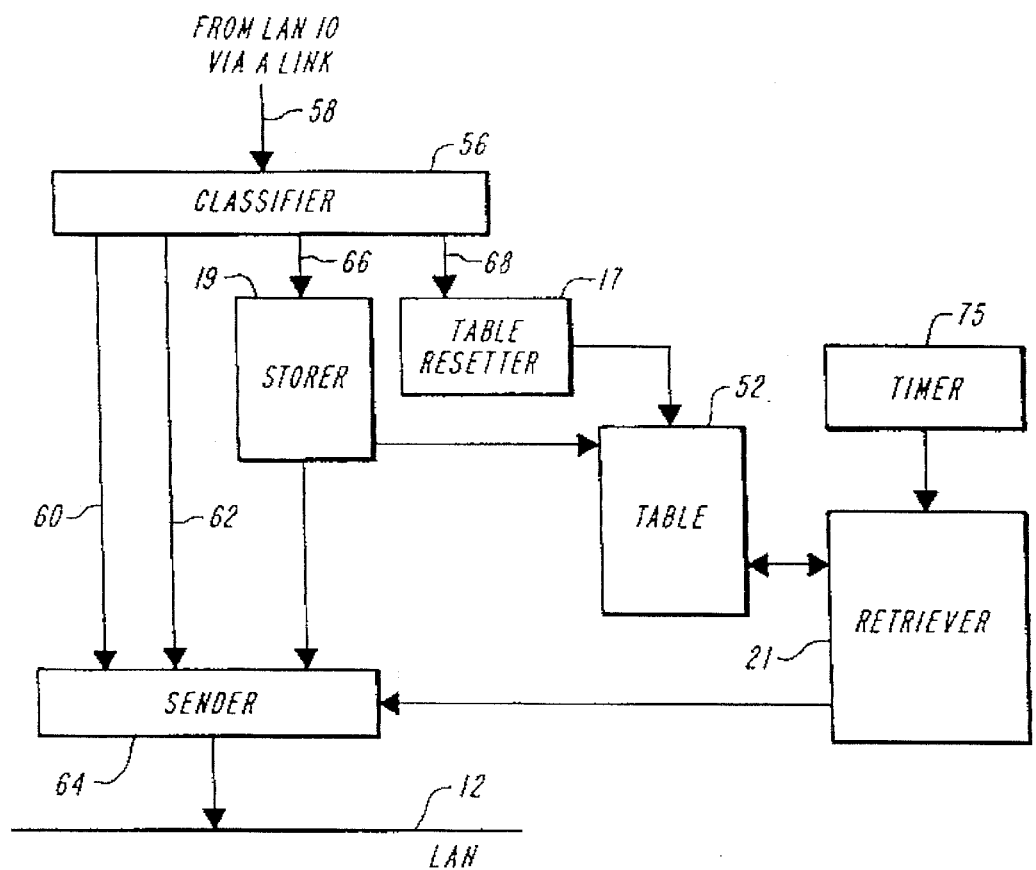
FIG. 5 is a functional block diagram of a device for performing the receive-side process.

To perform the receive-side process, the device 16 includes the modules shown in FIG. 5. The classifier 56 passes special flush messages 68 (received from the LAN 10 via a communication link) to a table resetter 17 which clears the table 52. The classifier 56 passes broadcast datagrams 66 (also received from the LAN 10 via a communication link) to a storer 19 which stores the broadcast datagram in the table 52 and then passes it to the sender 64 which provides it to the LAN 12.

A retriever 21 periodically retrieves entries from the table 52 and provides the retrieved broadcast datagrams to the sender 64 for transmittal to the LAN 12. The timer 75, whose period typically is set to match the frequency with which broadcast datagrams are transmitted by the LAN 10, is coupled to the retriever 21 and controls the frequency with which the retriever 21 accesses the table 52.

Note that while the device 14 is described as performing the transmit-side process of FIG. 2 and including the functional modules of FIG. 3, and the device 16 is described as performing the receive-side process of FIG. 4 and including the functional modules of FIG. 5, it should be understood that each of the devices 14, 16 generally will perform both the process of FIG. 2 and the process of FIG. 4 and also will include both the modules of FIG. 3 and the modules of FIG. 5. As stated previously, the two dotted circles 24, 26 shown in FIG. 1 emphasize this point.

It should be apparent to one skilled in the art that the invention relates to a filter and filtering process in which repetitive broadcast datagrams are discarded to eliminate the need to send the repetitive broadcast datagrams over a communication link. A device running a transmit-side process performs the discarding, and a device running a receive-side process builds a table of all repetitive broadcast datagrams and automatically regenerates the discarded broadcast datagrams without receiving the discarded broadcast datagrams over a communication link from the other device.

It also should be apparent to one skilled in the art that the disclosed invention can be used as a component in any system that processes datagrams from a local area network for transmission to a distant site.

The invention is applicable with any network operating system or protocol family (e.g., Novell NetWare, Microsoft LAN Manager, IBM NetBIOS, Apple AppleTalk, TCP/IP, and OSI).

Although the processes described herein can be implemented using software, they also can be implemented using well-known hardware elements.

Other modifications and implementations will occur to those skilled in the art without departing from the spirit and the scope of the invention as claimed. Accordingly, the invention is to be defined not by the preceding illustrative description, but by the following claims.

What is claimed is:

1. A method for reducing the flow of broadcast datagrams over a communication link, comprising:

(a) providing, at a first computer network, a first list of broadcast datagrams transmitted from the first computer network to a second computer network over a communication link between the first and second networks;

(b) providing a second list at the second computer network of broadcast datagrams received at the second computer network from the first computer network over the communication link, (c) comparing a broadcast datagram on the first computer network to the broadcast datagrams in the first list to determine if the compared broadcast datagram matches any of the broadcast datagrams in the first list, and (d) if the compared broadcast datagram matches any of the broadcast datagrams in the first list, (i) preventing the transmission of the compared broadcast datagram over the communication link to the second computer network, and (ii) providing the compared broadcast datagram to the second computer network as if it had been transmitted to the second computer network over the communication link by retrieving one of the broadcast datagrams from the second list which matches the compared broadcast datagram.

2. The method of claim 1 further comprising, if the compared broadcast datagram does not match any of the broadcast datagrams in the first list, transmitting the compared broadcast datagram to the second computer network over the communication link.

3. The method of claim 2 wherein the communication link comprises a private long distance telephone line.

4. The method of claim 2 wherein the communication link comprises a packet switched line.

5. The method of claim 2 wherein the communication link comprises a circuit switched line.

6. A device for reducing the flow of broadcast datagrams over a communication link, comprising:

a first receiver coupled to a first computer network for receiving, identifying, and discarding repetitive broadcast datagrams on the first computer network and intended to be sent over a communication link to a remote computer network, and a transmitter coupled to the first computer network for periodically providing repetitive broadcast datagrams to the first computer network which correspond to repetitive broadcast datagrams discarded by a remote receiver coupled to the remote computer network.

7. The device of claim 6 wherein the first receiver further comprises:

a classifier for identifying broadcast datagrams from other types of datagrams on the first computer network, a table assembler and maintainer for assembling and maintaining a table containing broadcast datagrams sent from the first computer network over the communication link to the remote computer network, a comparer for comparing a broadcast datagram identified by the classifier with the contents of the table to determine a match, a discarder for discarding the compared broadcast datagram if a match is found, and a sender for sending the compared broadcast datagram over the communication link to the remote computer network if a match is not found.

8. The device of claim 6 wherein the transmitter further comprises:

a classifier for identifying broadcast datagrams from other types of datagrams received from the remote computer network over the communication link, a table assembler and maintainer for assembling and maintaining a table containing broadcast datagrams received from the remote computer network over the communication link, and a retriever for periodically retrieving broadcast datagrams from the table which correspond to broadcast datagrams discarded by the remote receiver and for providing the retrieved broadcast datagrams to the first computer network.

9. The device of claim 6 wherein the communication link comprises a private long distance telephone line.

10. The device of claim 6 wherein the communication link comprises a packet switched line.

11. The device of claim 6 wherein the communication link comprises a circuit switched line.

12. A method for reducing the flow of broadcast datagrams over a communication link between two computer networks, comprising:

receiving, identifying, and discarding repetitive broadcast datagrams on a first computer network and intended to be sent over a communication link to a second computer network, and periodically providing repetitive broadcast datagrams to the second computer network which correspond to the discarded repetitive broadcast datagrams which were on the first computer network but discarded before being sent over the communication link to the second computer network.

13. The method of claim 12 wherein the receiving, identifying, and discarding is performed by a first bridge coupling the first computer network to the communication link, and the periodically providing is performed by a second bridge coupling the second computer network to the communication link.

14. The method of claim 12 wherein the receiving, identifying, and discarding is performed by a first router coupling the first computer network to the communication link, and the periodically providing is performed by a second router coupling the second computer network to the communication link.

* * * * *